(12) United States Patent
Li et al.

(10) Patent No.: US 11,769,226 B2
(45) Date of Patent: Sep. 26, 2023

(54) SUPER RESOLUTION NEURAL NETWORK WITH MULTIPLE OUTPUTS WITH DIFFERENT UPSCALING FACTORS

(71) Applicant: KYOCERA Document Solutions Inc., Osaka (JP)

(72) Inventors: Sheng Li, Irvine, CA (US); Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 443 days.

(21) Appl. No.: 17/158,553

(22) Filed: Jan. 26, 2021

(65) Prior Publication Data
US 2022/0237739 A1    Jul. 28, 2022

(51) Int. Cl.
G06K 9/00    (2022.01)
G06K 9/32    (2006.01)
G06T 3/40    (2006.01)
G06T 1/20    (2006.01)

(52) U.S. Cl.
CPC .............. *G06T 3/4046* (2013.01); *G06T 1/20* (2013.01); *G06T 3/4053* (2013.01); *G06T 3/4084* (2013.01)

(58) Field of Classification Search
None
See application file for complete search history.

(56) References Cited

U.S. PATENT DOCUMENTS

| 9,865,036 B1 * | 1/2018 | Liu | G06F 18/214 |
| 11,145,074 B2 * | 10/2021 | Guizilini | G06T 7/579 |
| 2018/0182165 A1 * | 6/2018 | Zatepyakin | G06T 17/205 |
| 2018/0231871 A1 * | 8/2018 | Wang | G03B 13/30 |
| 2019/0026538 A1 * | 1/2019 | Wang | G06V 40/172 |

* cited by examiner

*Primary Examiner* — Avinash Yentrapati
(74) *Attorney, Agent, or Firm* — GrowIP Law Group LLC

(57) ABSTRACT

Systems and methods upscale an input image by a final upscaling factor. The systems and methods employ a first module implementing a super resolution neural network with feature extraction layers and multiple sets of upscaling layers sharing the feature extraction layers. The multiple sets of upscaling layers upscale the input image according to different respective upscaling factors to produce respective first module outputs. The systems and methods select the first module output with the respective upscaling factor closest to the final upscaling factor. If the respective upscaling factor for the selected first module output is equal to the final upscaling factor, the systems and methods output the selected first module output. Otherwise, the systems and methods provide the selected first module output to a second module that upscales the selected first module output to produce a second module output corresponding to the input image upscaled by the final upscaling factor.

20 Claims, 6 Drawing Sheets

SUPER RESOLUTION NEURAL NETWORK WITH MULTIPLE OUTPUTS WITH DIFFERENT UPSCALING FACTORS

BACKGROUND

In image processing, super-resolution (SR) refers to a class of techniques for increasing the resolution of an imaging system. In a typical scenario, a SR system receives an input image and upscales the input image to a higher resolution output image. Prior to the upscaling, the details of the higher resolution output image are essentially unknown. The SR system operates by estimating the details of the higher resolution output image from characteristics of the input image.

There are various approaches for estimating a high-resolution (HR) image from its low-resolution (LR) image. For example, with the nearest neighbor approach, the color of a newly-created pixel in the HR image is determined based on the color of a nearest pixel in the LR image. With the bilinear and bicubic approaches, colors for newly-created pixels in the HR image are interpolated from colors of surrounding pixels in the LR image.

Other approaches estimate a HR image from its LR image using machine learning. For example, some approaches utilize convolutional neural networks (CNNs) to establish a mapping between LR image information and HR image information. CNNs are neural networks that include multiple layers, and use convolution in at least one of the layers. More specifically, CNNs include convolution layers that perform a convolution by sliding a filter, referred to as a convolution filter, over an input. As a simplified example, the input may be a 10×10 matrix of input values, and the convolution filter may be a 3×3 matrix of filter values. At each slide position, the convolution layer performs a matrix multiplication between the convolution filter and the portion of the input identified by the slide position. The portion identified by the slide position is referred to as the receptive field. The resulting sum is then added to a feature map at a position corresponding to the receptive field.

A Super-Resolution Generative Adversarial Network (SRGAN) is a machine learning system that uses two competing neural networks in order to generate synthetic SR images that appear to be real images. The two competing neural networks are referred to as a generator network and a discriminator network. The generator network is a CNN that receives a LR image as input and generates a HR image as output. The discriminator network is a separate CNN that is trained to distinguish SR images generated by the generator network from real images. During a training process, the generator network and the discriminator network can be optimized in an alternating manner, such that the generator network learns to generate SR images that are very similar to real images and, as such, difficult for the discriminator network to distinguish from real images. After sufficient training, the generator network can be used for SR.

SUMMARY

An example method for processing an image includes receiving an input image. The method includes upscaling the input image according to a final upscaling factor F. To upscale the input image, the method includes providing the input image to a first module executed by a computer processing system. The first module implements a super resolution neural network. The super resolution neural network includes feature extraction layers and multiple sets of upscaling layers sharing the feature extraction layers. The multiple sets of upscaling layers upscale the input image according to different respective upscaling factors to produce respective first module outputs. The method includes selecting the first module output from the set of upscaling layers with the respective upscaling factor closest to the final upscaling factor F. The method includes, if the respective upscaling factor associated with the selected first module output is not equal to the final upscaling factor F, providing the selected first module output to a second module executed by the computer processing system and configured to further upscale the selected first module output to produce a second module output corresponding to the input image upscaled by the final upscaling factor F. The method includes outputting, by the computer processing system: the selected first module output if the respective upscaling factor associated with the selected first module output is equal to the final upscaling factor F, or the second module output if the respective upscaling factor associated with the selected first module output is not equal to the final upscaling factor F.

An example system for processing images includes one or more computer storage devices configured to store: (i) a first module implementing a super resolution neural network, the super resolution neural network including feature extraction layers and multiple sets of upscaling layers sharing the feature extraction layers, the multiple sets of upscaling layers configured to upscale an image according to different respective upscaling factors; and (i) a second module configured to further upscale the image. The system includes one or more processors configured to execute instructions, the instructions causing the one or more processors to receive an input image. The instructions cause the one or more processors to upscale the input image according to a final upscaling factor F by: (i) providing the input image to the first module, the multiple sets of upscaling layers of the super resolution neural network upscaling the input image according to the different respective upscaling factors to produce respective first module outputs; (ii) selecting the first module output from the set of upscaling layers with the respective upscaling factor closest to the final upscaling factor F; and (iii) if the respective upscaling factor associated with the selected first module output is not equal to the final upscaling factor F, providing the selected first module output to the second module to further upscale the selected first module output to produce a second module output corresponding to the input image upscaled by the final upscaling factor F. The instructions cause the one or more processors to output the selected first module output if the respective upscaling factor associated with the selected first module output is equal to the final upscaling factor F, or the second module output if the respective upscaling factor associated with the selected first module output is not equal to the final upscaling factor F.

One or more example non-transitory computer-readable storage media have computer-executable instructions stored thereon. When executed by one or more processors, the computer-executable instructions cause the one or more processors to receive an input image. The computer-executable instructions cause the one or more processors to upscale the input image according to a final upscaling factor F by: (i) providing the input image to a first module, the first module implementing a super resolution neural network, the super resolution neural network including feature extraction layers and multiple sets of upscaling layers sharing the feature extraction layers, the multiple sets of upscaling layers configured to upscale the input image according to different respective upscaling factors to produce respective first module outputs; (ii) selecting the first module output from the set of upscaling layers with the respective upscaling factor closest to the final upscaling factor F; and (iii) if the respective upscaling factor associated with the selected first module output is not equal to the final upscaling factor F, providing the selected first module output to a second module and configured to further upscale the selected first module output to produce a second module output corresponding to the input image upscaled by the final upscaling factor F. The computer-executable instructions cause the one or more processors to output the selected first module output if the respective upscaling factor associated with the selected first module output is equal to the final upscaling factor F, or the second module output if the respective upscaling factor associated with the selected first module output is not equal to the final upscaling factor F.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
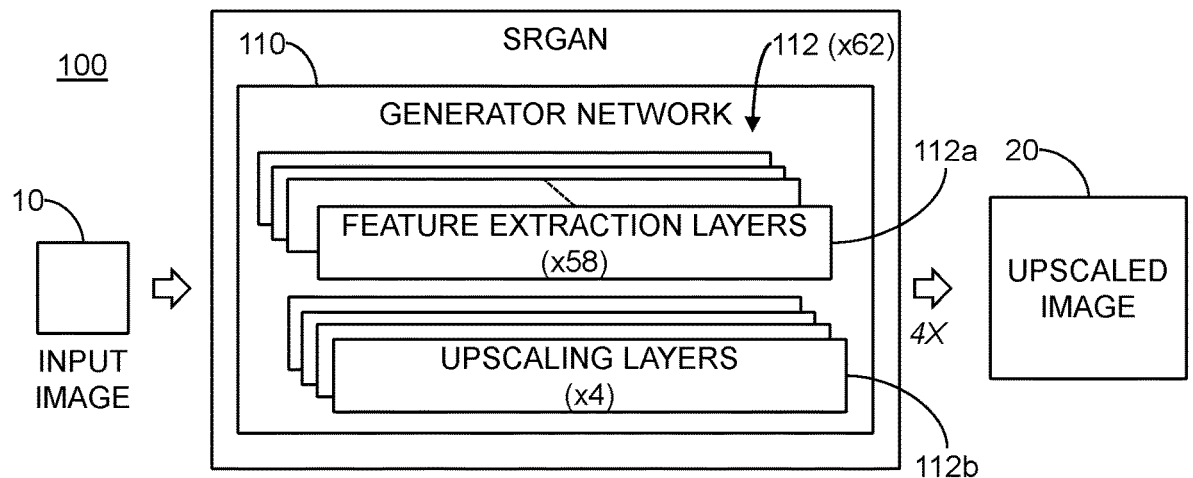
FIG. 1 illustrates an example implementation of a Super-Resolution Generative Adversarial Network (SRGAN).

FIG. 1 illustrates an example implementation 100 of a Super-Resolution Generative Adversarial Network (SRGAN). The generator network 110 is a CNN that receives an input image 10 (low-resolution (LR) image) and generates an output image 20 (high-resolution (HR) image). The generator network 110 includes feature extraction (convolution) layers 112a configured to extract feature maps from the input image 10. Additionally, the generator network 110 includes upscaling layers 112b configured to increase a resolution of the input image 10. As illustrated in FIG. 1, the generator network 110 employs sixty-two layers 112, where the feature extraction layers 112a make up fifty-eight of the layers 112 and the upscaling layers 112b make up the remaining four layers 112.

Figure 2:
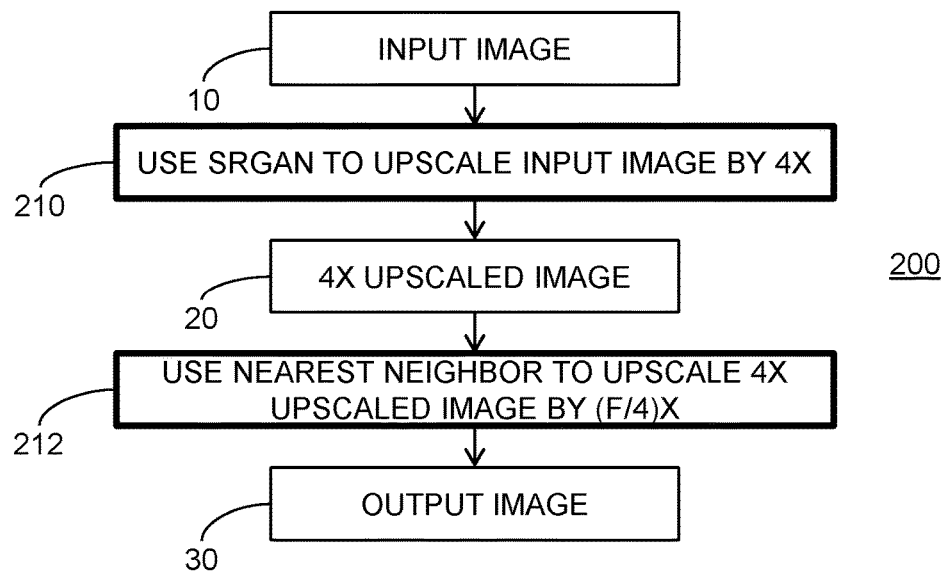
FIG. 2 illustrates an example method for upscaling an input image by a desired factor $F_{FINAL}$ with the SRGAN implementation illustrated in FIG. 1.

As shown, the SRGAN implementation 100 is trained to upscale the input image 10 by a fixed upscaling factor of four (4X). As such, the SRGAN implementation 100 can only upscale the input image 10 by a desired factor $F_{FINAL}$ equal to or greater than 4X. Furthermore, to upscale the input image 10 by a desired factor $F_{FINAL}$ greater than 4X, a method 200 as shown in FIG. 2 is employed. In act 210, the SRGAN implementation 100 is employed to upscale the input image 10 by 4X. In act 220, another upscaling approach, such as the nearest neighbor approach, receives the 4X upscaled image 20 from the SRGAN implementation 100 and further upscales the 4X upscaled image 20 by a factor of $F_{FINAL}$ divided by 4X ((F/4)X) to achieve the desired upscaling in an output image 30. For example, if the desired upscaling factor $F_{FINAL}$ is 16X, the act 220 employs the nearest neighbor approach to upscale the 4X upscaled image 10 further by 16X/4X=4X. Disadvantageously, the nearest neighbor approach cannot achieve the same image quality as SRGAN, particularly when the desired upscaling factor $F_{FINAL}$ is as large as 16X.

Figure 3:
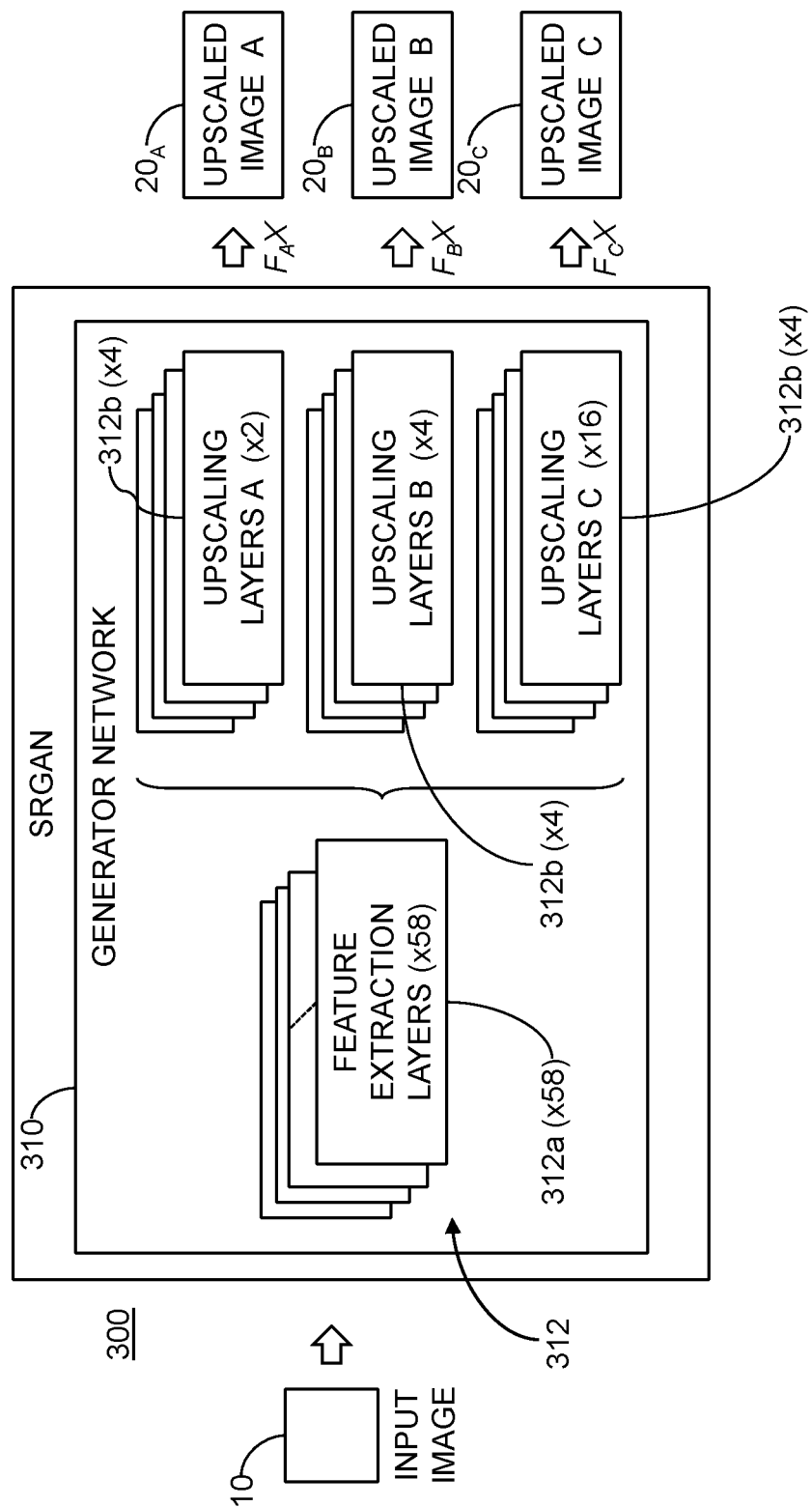
FIG. 3 illustrates another example implementation of a SRGAN.

FIG. 3 illustrates another example implementation 300 of a SRGAN according to aspects of the present disclosure. The generator network 310 receives an input image 10 and generates output images $20_{A, B, C}$. The generator network 310 includes feature extraction layers 312a configured to extract feature maps from the input image 10. Additionally, the generator network 310 includes upscaling layers 312b configured to increase a resolution of the input image 10.

Similar to the generator network 110 above, the feature extraction layers 312a make up fifty-eight of layers 312 of the generator network 310. However, in contrast to the generator network 110 which employs one set of four upscaling layers 112b, the generator network 310 includes three sets A, B, C of four upscaling layers 312b. Each of the sets A, B, C of upscaling layers 312b share the fifty-eight feature extraction layers 312a, but each set A, B, C upscales the input image by a different scaling factor $F_A$, $F_B$, $F_C$, respectively. As such, the SRGAN implementation 300 can produce the three different output images $20_A$, $20_B$, $20_C$ based on the different scaling factors $F_A$, $F_B$, $F_C$, respectively.

Figure 4:
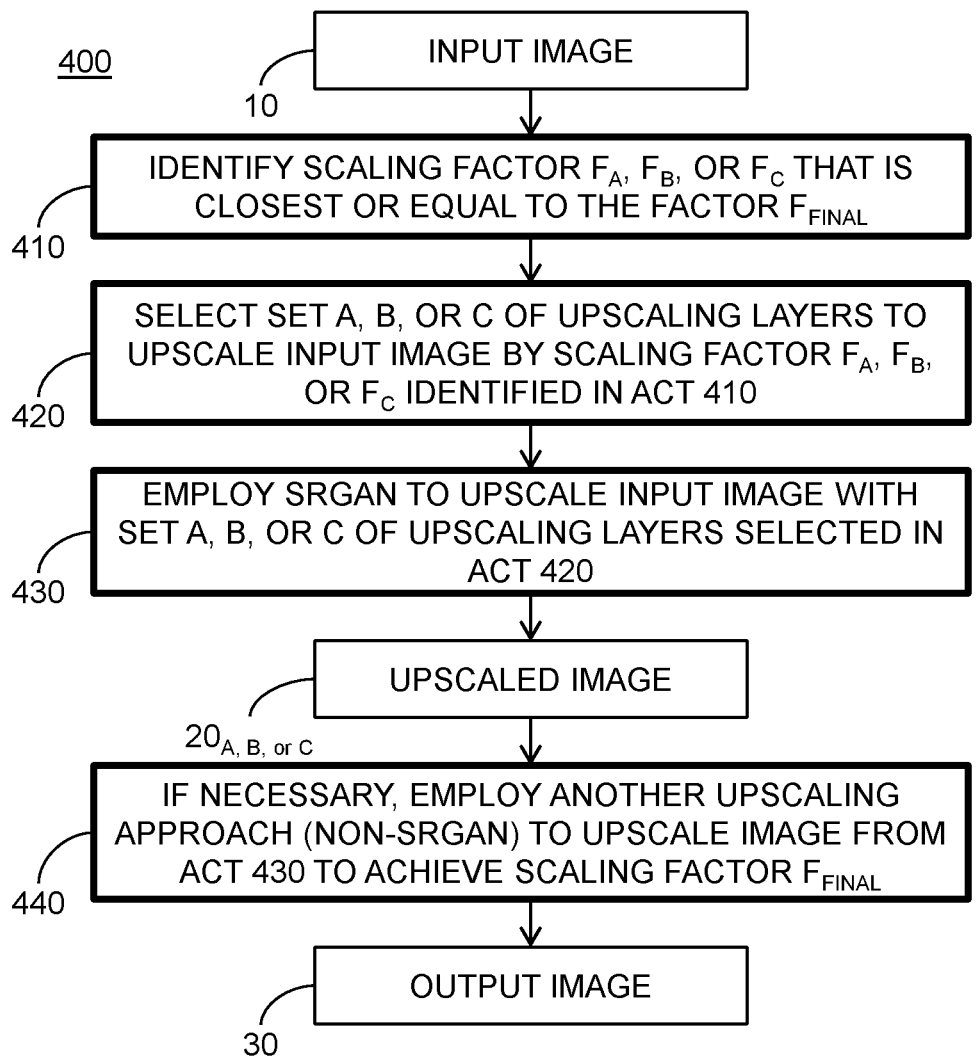
FIG. 4 illustrates an example method for upscaling an input image by a desired factor $F_{FINAL}$ with the SRGAN implementation illustrated in FIG. 3.

FIG. 4 illustrates an example method 400 for upscaling the input image 10 by a desired factor $F_{FINAL}$ with the SRGAN implementation 300. Act 410 involves identifying the scaling factor $F_A$, $F_B$, or $F_C$ that is closest or equal to (not greater than) the desired scaling factor $F_{FINAL}$. Act 420 involves selecting the set A, B, or C of upscaling layers 312b to upscale the input image 10 by the scaling factor $F_A$, $F_B$, or $F_C$ identified in the act 410. In act 430, the SRGAN implementation 300 is employed to upscale the input image 10 with the set A, B, or C of upscaling layers 312b selected in the act 420. The SRGAN implementation 300 thus produces the upscaled image $20_A$, $20_B$, or $20_C$ based on the set A, B, or C of upscaling layers 312b selected in act 420. If necessary, in act 440, another upscaling approach, such as the nearest neighbor approach, receives the upscaled image $20_A$, $20_B$, or $20_C$ produced in the act 430 and further upscales the upscaled image $20_A$, $20_B$, or $20_C$ by a scaling factor of $F_{FINAL}$ divided by the scaling factor $F_A$, $F_B$, or $F_C$ identified in the act 410. Act 440 produces an output image that corresponds to the input image 10 upscaled by the desired factor $F_{FINAL}$. For example, the scaling factor $F_A$ may be 2X, the scaling factor $F_B$ may be 4X, and the scaling factor $F_C$ may be 16X. As such, if the desired scaling factor $F_{FINAL}$ is 8X, the scaling factor $F_B$=4X is identified in the act 410, the set B of upscaling layers 312b is selected in act 420 to upscale the input image 10 by the scaling factor $F_B$=4X, and the resulting upscaled image $20_B$ from the act 430 is upscaled further by 8X/4X=2X in act 440 to achieve the desired scaling factor $F_{FINAL}$.

Figure 5:
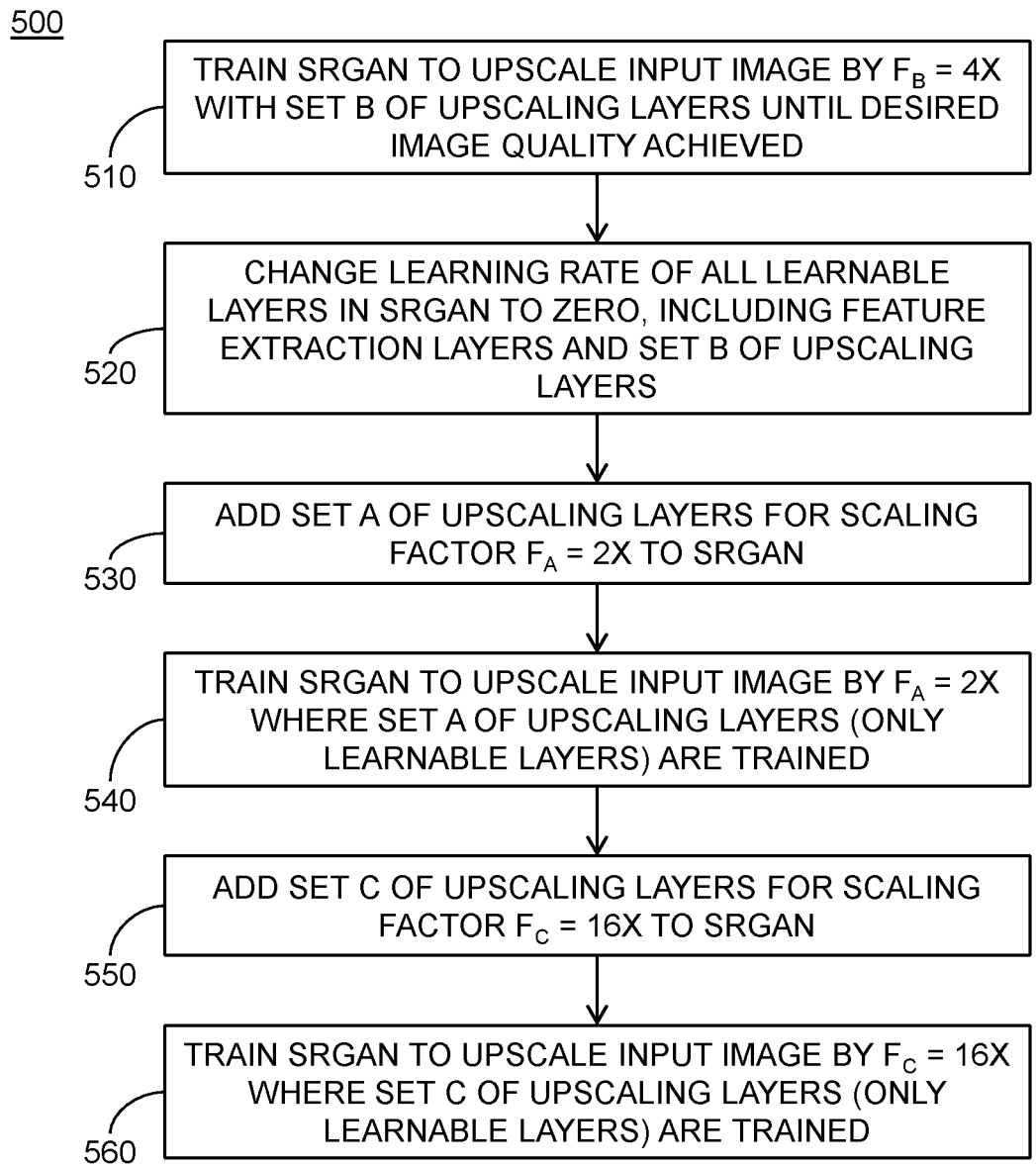
FIG. 5 illustrates an example method for training the SRGAN implementation illustrated in FIG. 3.

FIG. 5 illustrates an example method 500 for training the SRGAN in the implementation 300, where the scaling factor $F_A$ is 2X, the scaling factor $F_B$ is 4X, and the scaling factor $F_C$ is 16X. In act 510, the SRGAN is trained to upscale an input image by $F_B$=4X with the set B of upscaling layers 312*b* in the same manner as the SRGAN in the implementation 100 above. Once the desired image quality is achieved by the training in act 510, the SRGAN is frozen in act 520 by setting the learning rate of all learnable layers in SRGAN to zero, including the feature extraction layers 312*a* as well as the set B of upscaling layers 312*b*. The set A of upscaling layers 312*b* for the scaling factor $F_A$=2X is added in act 530 to the SRGAN. In act 540, the SRGAN is trained to upscale an input image by $F_A$=2X where the set A of upscaling layers 312*b* (the only learnable layers) are trained. The set C of upscaling layers 312*b* for the scaling factor $F_C$=16X is added in act 550 to the SRGAN. In act 560, the SRGAN is trained to upscale an input image with by $F_C$=16X where the set C of upscaling layers 312*b* (the only learnable layers) are trained.

Figure 6:
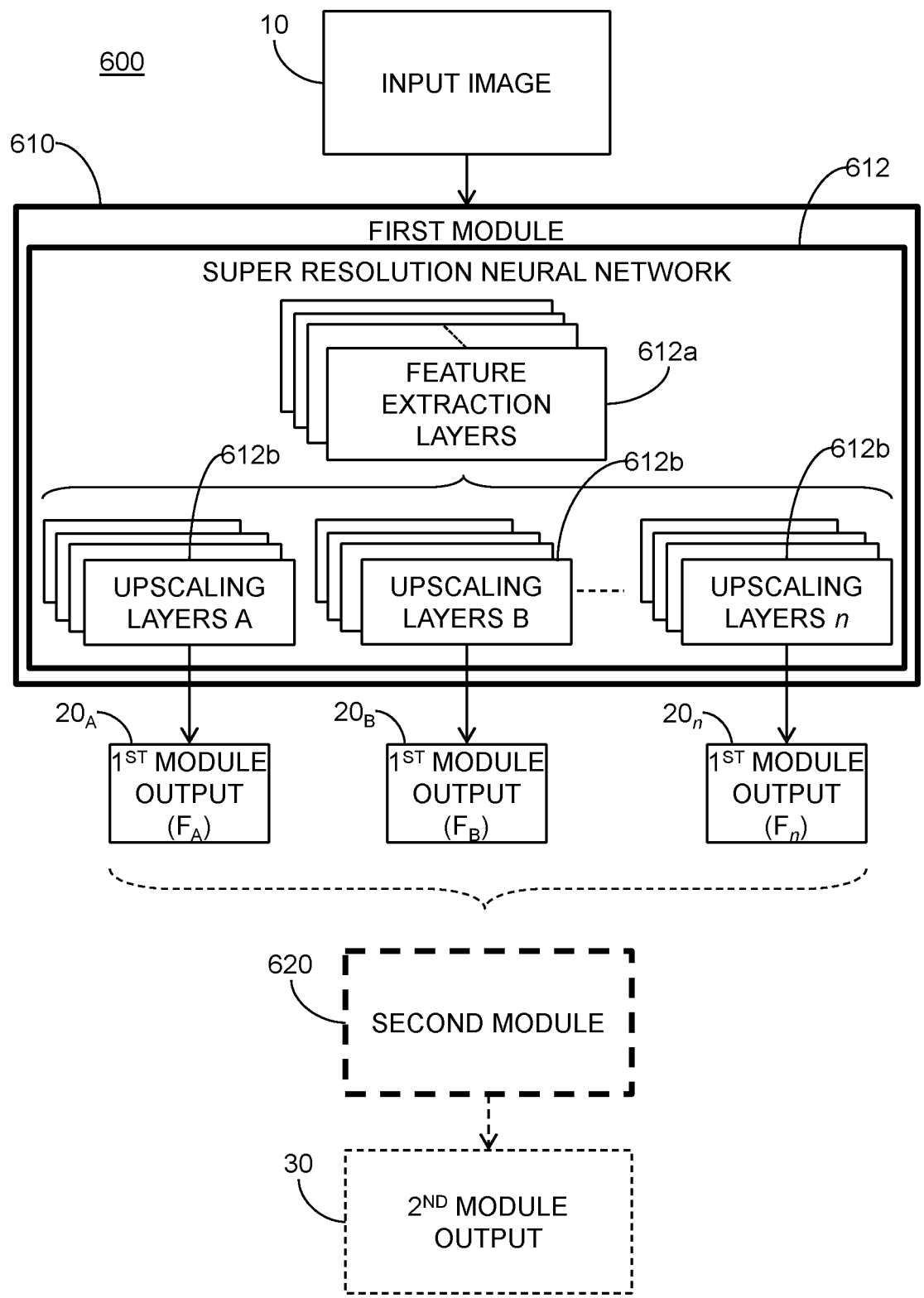
FIG. 6 illustrates an example system for processing images with a super resolution neural network.

FIG. 6 illustrates an example system 600 for processing images according to aspects of the present disclosure. The system 600 includes a first module 610. The first module 610 implements a super resolution neural network 612 including feature extraction layers 612*a* and multiple sets n (A, B, C, . . . ) of upscaling layers 612*b* sharing the feature extraction layers 612*a*. The multiple sets n of upscaling layers 612*b* can upscale an input image 10 according to different respective upscaling factors $F_n$. For instance, the super resolution neural network 612 may be a SRGAN, where the SRGAN includes fifty-eight of the feature extraction layers 612*a* and four upscaling layers 612*b* for each of the multiple sets n.

The system 600 also includes a second module 620 to upscale an image according to another approach (other than the super resolution neural network 612). For instance, the second module 620 may implement the nearest neighbor approach to upscale the image.

The system 600 receives an input image 10 and upscales the input image 10 by a final upscaling factor $F_{FINAL}$. The first module 610 implementing the super resolution neural network 612 receives the input image 10. One of the multiple sets n of upscaling layers 612*b* upscales the input image 10 according to a respective one of the upscaling factors $F_n$ to produce a first module output 20*n*. In particular, the first module output 20*n* is upscaled with the upscaling factor closest to the final upscaling factor $F_{FINAL}$. The system 600 outputs the first module output 20 if the upscaling factor associated with the first module output 20 is equal to the final upscaling factor $F_{FINAL}$. Alternatively, if the upscaling factor associated with the first module output 20 is not equal to the final upscaling factor $F_{FINAL}$, the second module 620 is employed to further upscale the first module output 20 to produce a second module output 30 corresponding to the input image 10 upscaled by the final upscaling factor $F_{FINAL}$, and the system 600 outputs the second module output 30.

As described above, the super resolution neural network 612 can be trained with a first set A of upscaling layers 612*b* until a desired image quality for the first upscaling factor $F_A$ is achieved. Upon achieving the desired image quality for the first upscaling factor $F_A$, a learning rate of the feature extraction layers 612*a* and the first set A of upscaling layers 612*b* is set to zero. The second set B of upscaling layers 612*b* is added to the super resolution neural network 612, and only the second set B is trained until a desired image quality for the second upscaling factor $F_B$ is achieved. The super resolution neural network 612 may be further produced by adding at least one additional set of upscaling layers 612*b* associated with an additional upscaling factor, and for the at least one additional set of upscaling layers 612*b*, training only the at least one additional set until a desired image quality for the additional factor is achieved.

The modules as illustrated in the figures may be stored on one or more computer storage devices and implemented on a computer processing system. For instance, the modules may be implemented as computer-executable instructions stored on one or more non-transitory computer-readable storage media and executable by one or more processors. In general, any aspect of the systems and methods described herein may be achieved by one or more processors executing computer-executable instructions stored on one or more non-transitory computer-readable storage media.

Figure 7:
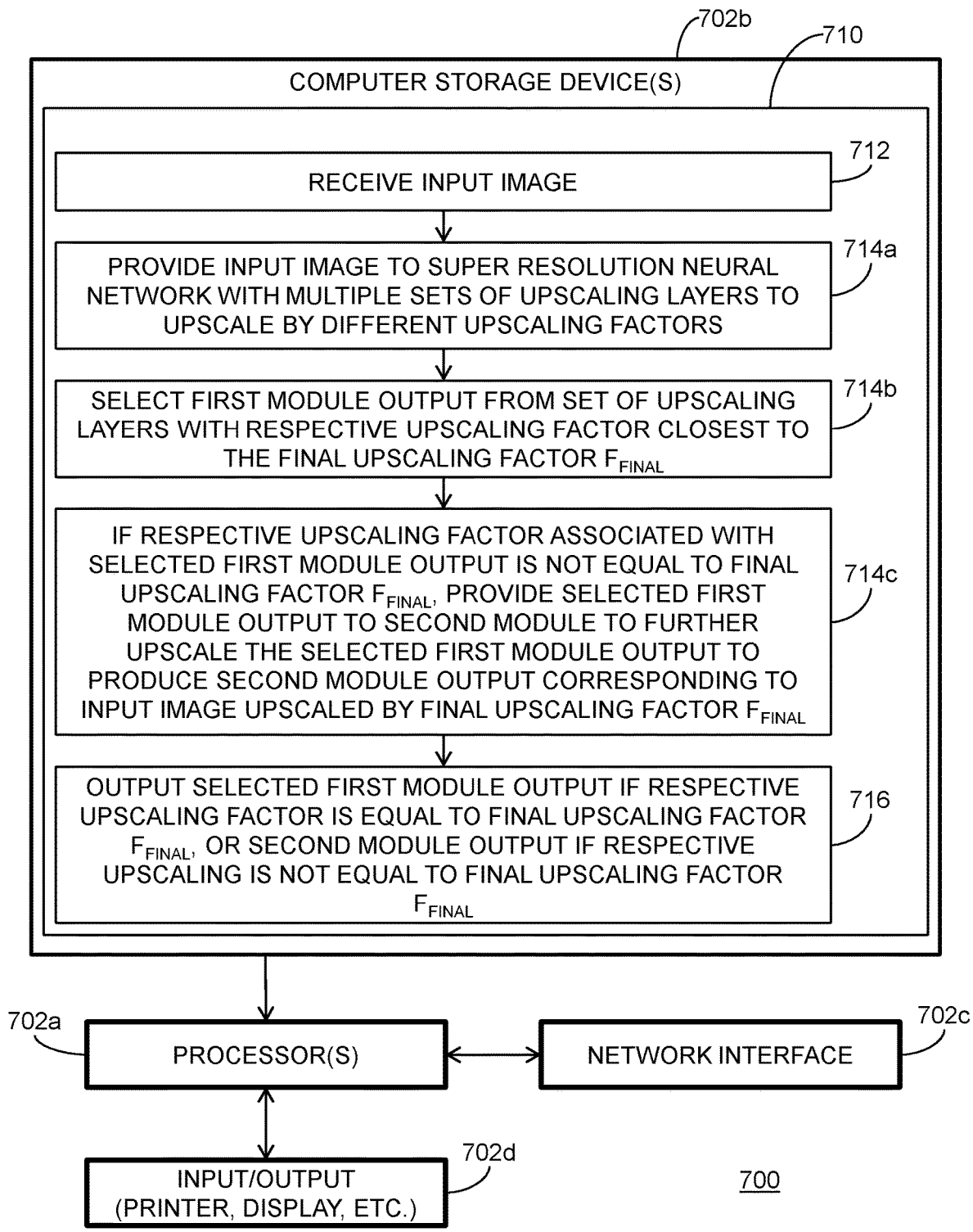
FIG. 7 illustrates an example computing system for processing images with a super resolution neural network.

For instance, as shown in an example computing system 700 illustrated in FIG. 7, one or more non-transitory computer-readable storage media 702*b* can store instructions 710 that are executable to cause one or more processors 702*a* to: receive an input image in an act 712; upscale the input image according to a final upscaling factor $F_{FINAL}$ by: (i) providing the input image to a first module in act 714*a*, the first module implementing a super resolution neural network, the super resolution neural network including feature extraction layers and multiple sets of upscaling layers sharing the feature extraction layers, the multiple sets of upscaling layers configured to upscale the input image according to different respective upscaling factors to produce respective first module outputs, (ii) selecting the first module output from the set of upscaling layers with the respective upscaling factor closest to the final upscaling factor $F_{FINAL}$ in act 714*b*, and (iii) if the respective upscaling factor associated with the selected first module output is not equal to the final upscaling factor $F_{FINAL}$, providing the selected first module output in act 714*c* to a second module configured to further upscale the selected first module output to produce a second module output corresponding to the input image upscaled by the final upscaling factor $F_{FINAL}$; and output in act 716 the selected first module output if the respective upscaling factor associated with the selected first module output is equal to the final upscaling factor $F_{FINAL}$, or the second module output if the respective upscaling factor associated with the selected first module output is not equal to the final upscaling factor $F_{FINAL}$.

The computing system 700 may be implemented as a mobile phone, tablet computer, wearable computer, desktop computer, laptop computer, smart device, or the like. The computing system 700 may include the one or more processors 702*a*, one or more computer storage devices 702*b*, including one or more non-transitory computer-readable storage media, a network interface 702*c*, and input/output devices 702*d*, all of which may be coupled by a system bus or a similar mechanism. The one or more processors 704*a* may include one or more central processing units (CPUs), such as one or more general purpose processors and/or one or more dedicated processors (e.g., application specific integrated circuits also known as ASICs or digital signal processors also known as DSPs, etc.).

The one or more computer storage devices 702*b* may include volatile and/or non-volatile data storage and may be integrated in whole or in part with the one or more processors 702*a*. In general, the one or more computer storage devices 702*b* may store program instructions, executable by the one or more processors 702*a*, and data that are manipulated by these instructions to carry out the various methods, processes, or functions described herein. Alternatively, these methods, processes, or functions can be defined by hardware, firmware, and/or any combination of hardware, firmware and software. Therefore, one or more computer storage devices 702b may include a tangible, non-transitory computer-readable medium, having stored thereon program instructions that, upon execution by one or more processors, cause computing system 700 to carry out any of the methods, processes, or functions disclosed in this specification or the accompanying drawings.

The network interface 702c may be employed to receive input, such as the input images described above, or to provide output, such as the output images described above. The network interface 702c may take the form of a wire line connection, such as an Ethernet, Token Ring, or T-carrier connection. The network interface 702c may alternatively take the form of a wireless connection, such as WiFi, BLUETOOTH®, or a wide-area wireless connection. However, other forms of physical layer connections and other types of standard or proprietary communication protocols may be used over network interface 702c. Furthermore, network interface 702c may comprise multiple physical communication interfaces. Additionally, the computing system 700 may support remote access from another device, via the network interface 702c or via another interface, such as an RS-132 or Universal Serial Bus (USB) port.

The input/output devices 702d may facilitate user interaction with the computing system 700. The input/output devices 702d may include multiple types of input devices, such as a keyboard, a mouse, a touch screen, a microphone and/or any other device that is capable of receiving input from a user. Similarly, the input/output function 702d may include multiple types of output devices, such as a printing device, a display, one or more light emitting diodes (LEDs), speaker, or any other device that is capable of providing output discernible to a user. For instance, the printing device can print the output image. Additionally or alternatively, the display device can display the output image.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, comprising:
  receiving an input image;
  upscaling the input image according to a final upscaling factor F by:
    providing the input image to a first module executed by a computer processing system, the first module implementing a super resolution neural network, the super resolution neural network including feature extraction layers and multiple sets of upscaling layers sharing the feature extraction layers, the multiple sets of upscaling layers configured to upscale the input image according to different respective upscaling factors to produce respective first module outputs;
    selecting the first module output from the set of upscaling layers with the respective upscaling factor closest to the final upscaling factor F; and
    if the respective upscaling factor associated with the selected first module output is not equal to the final upscaling factor F, providing the selected first module output to a second module executed by the computer processing system and configured to further upscale the selected first module output to produce a second module output corresponding to the input image upscaled by the final upscaling factor F; and
  outputting, by the computer processing system:
    the selected first module output if the respective upscaling factor associated with the selected first module output is equal to the final upscaling factor F, or
    the second module output if the respective upscaling factor associated with the selected first module output is not equal to the final upscaling factor F.

2. The method of claim 1, wherein the super resolution neural network implemented by the first module is a Super-Resolution using a Generative Adversarial Network (SR-GAN).

3. The method of claim 2, wherein the SRGAN includes 58 of the feature extraction layers and four upscaling layers for each set of upscaling layers.

4. The method of claim 1, wherein the multiple sets of upscaling layers includes at least a first set of upscaling layers configured to upscale the input image according to a first upscaling factor and a second set of upscaling layers configured to upscale the input image according to a second upscaling factor, and
  the super resolution neural network is produced by:
    training the super resolution neural network with the first set of upscaling layers until a desired image quality for the first upscaling factor is achieved;
    upon achieving the desired image quality for the first upscaling factor, setting a learning rate of the feature extraction layers and the first set of upscaling layers to zero;
    adding the second set of upscaling layers to the super resolution neural network; and
    training only the second set of upscaling layers until a desired image quality for the second upscaling factor is achieved.

5. The method of claim 4, wherein the super resolution neural network is further produced by:
  adding, to the super resolution neural network, at least one additional set of upscaling layers associated with an additional upscaling factor; and
  for the at least one additional set of upscaling layers, training only the at least one additional set of upscaling layers until a desired image quality for the at least one additional factor is achieved.

6. The method of claim 1, wherein the super resolution neural network includes a first set of upscaling layers configured to upscale the input image according to a first upscaling factor of 2X, a second set of upscaling layers configured to upscale the input image according to a second upscaling factor of 4X, and a third set of upscaling layers configured to upscale the input image according to a third upscaling factor of 16X.

7. The method of claim 1, wherein the second module implements a nearest neighbor approach.

8. A system for processing images, the system comprising:
one or more computer storage devices configured to store:
a first module implementing a super resolution neural network, the super resolution neural network including feature extraction layers and multiple sets of upscaling layers sharing the feature extraction layers, the multiple sets of upscaling layers configured to upscale an image according to different respective upscaling factors; and
a second module configured to further upscale the image;
one or more processors configured to execute instructions, the instructions causing the one or more processors to:
receive an input image;
upscale the input image according to a final upscaling factor F by:
providing the input image to the first module, the multiple sets of upscaling layers of the super resolution neural network upscaling the input image according to the different respective upscaling factors to produce respective first module outputs;
selecting the first module output from the set of upscaling layers with the respective upscaling factor closest to the final upscaling factor F; and
if the respective upscaling factor associated with the selected first module output is not equal to the final upscaling factor F, providing the selected first module output to the second module to further upscale the selected first module output to produce a second module output corresponding to the input image upscaled by the final upscaling factor F; and
output:
the selected first module output if the respective upscaling factor associated with the selected first module output is equal to the final upscaling factor F, or
the second module output if the respective upscaling factor associated with the selected first module output is not equal to the final upscaling factor F.

9. The system of claim 8, wherein the super resolution neural network implemented by the first module is a Super-Resolution using a Generative Adversarial Network (SR-GAN).

10. The system of claim 9, wherein the SRGAN includes 58 of the feature extraction layers and four upscaling layers for each set of upscaling layers.

11. The system of claim 8, wherein the multiple sets of upscaling layers includes at least a first set of upscaling layers configured to upscale the input image according to a first upscaling factor and a second set of upscaling layers configured to upscale the input image according to a second upscaling factor, and
the super resolution neural network is produced by:
training the super resolution neural network with the first set of upscaling layers until a desired image quality for the first upscaling factor is achieved;
upon achieving the desired image quality for the first upscaling factor, setting a learning rate of the feature extraction layers and the first set of upscaling layers to zero;
adding the second set of upscaling layers to the super resolution neural network; and
training only the second set of upscaling layers until a desired image quality for the second upscaling factor is achieved.

12. The system of claim 11, wherein the super resolution neural network is further produced by:
adding, to the super resolution neural network, at least one additional set of upscaling layers associated with an additional upscaling factor; and
for the at least one additional set of upscaling layers, training only the at least one additional set of upscaling layers until a desired image quality for the at least one additional factor is achieved.

13. The system of claim 8, wherein the super resolution neural network includes a first set of upscaling layers configured to upscale the input image according to a first upscaling factor of 2X, a second set of upscaling layers configured to upscale the input image according to a second upscaling factor of 4X, and a third set of upscaling layers configured to upscale the input image according to a third upscaling factor of 16X.

14. The system of claim 8, wherein the second module implements a nearest neighbor approach.

15. One or more non-transitory computer-readable storage media, having computer-executable instructions stored thereon, wherein when executed by a one or more processors, the computer-executable instructions cause the one or more processors to:
receive an input image;
upscale the input image according to a final upscaling factor F by:
providing the input image to a first module, the first module implementing a super resolution neural network, the super resolution neural network including feature extraction layers and multiple sets of upscaling layers sharing the feature extraction layers, the multiple sets of upscaling layers configured to upscale the input image according to different respective upscaling factors to produce respective first module outputs;
selecting the first module output from the set of upscaling layers with the respective upscaling factor closest to the final upscaling factor F; and
if the respective upscaling factor associated with the selected first module output is not equal to the final upscaling factor F, providing the selected first module output to a second module configured to further upscale the selected first module output to produce a second module output corresponding to the input image upscaled by the final upscaling factor F; and
output:
the selected first module output if the respective upscaling factor associated with the selected first module output is equal to the final upscaling factor F, or
the second module output if the respective upscaling factor associated with the selected first module output is not equal to the final upscaling factor F.

16. The one or more non-transitory computer-readable storage media of claim 15, wherein the super resolution neural network implemented by the first module is a Super-Resolution using a Generative Adversarial Network (SR-GAN).

17. The one or more non-transitory computer-readable storage media of claim 15, wherein the multiple sets of upscaling layers include at least a first set of upscaling layers configured to upscale the input image according to a first upscaling factor and a second set of upscaling layers configured to upscale the input image according to a second upscaling factor, and the super resolution neural network is produced by:

training the super resolution neural network with the first set of upscaling layers until a desired image quality for the first upscaling factor is achieved;

upon achieving the desired image quality for the first upscaling factor, setting a learning rate of the feature extraction layers and the first set of upscaling layers to zero;

adding the second set of upscaling layers to the super resolution neural network; and training only the second set of upscaling layers until a desired image quality for the second upscaling factor is achieved.

18. The one or more non-transitory computer-readable storage media of claim 17, wherein the super resolution neural network is further produced by:

adding, to the super resolution neural network, at least one additional set of upscaling layers associated with an additional upscaling factor; and for the at least one additional set of upscaling layers, training only the at least one additional set of upscaling layers until a desired image quality for the at least one additional factor is achieved.

19. The one or more non-transitory computer-readable storage media of claim 15, wherein the super resolution neural network includes a first set of upscaling layers configured to upscale the input image according to a first upscaling factor of 2X, a second set of upscaling layers configured to upscale the input image according to a second upscaling factor of 4X, and a third set of upscaling layers configured to upscale the input image according to a third upscaling factor of 16X.

20. The one or more non-transitory computer-readable storage media of claim 15, wherein the second module implements a nearest neighbor approach.

* * * * *